Oct. 16, 1934.  B. C. PLACE  1,976,889
FASTENER
Filed June 26, 1931
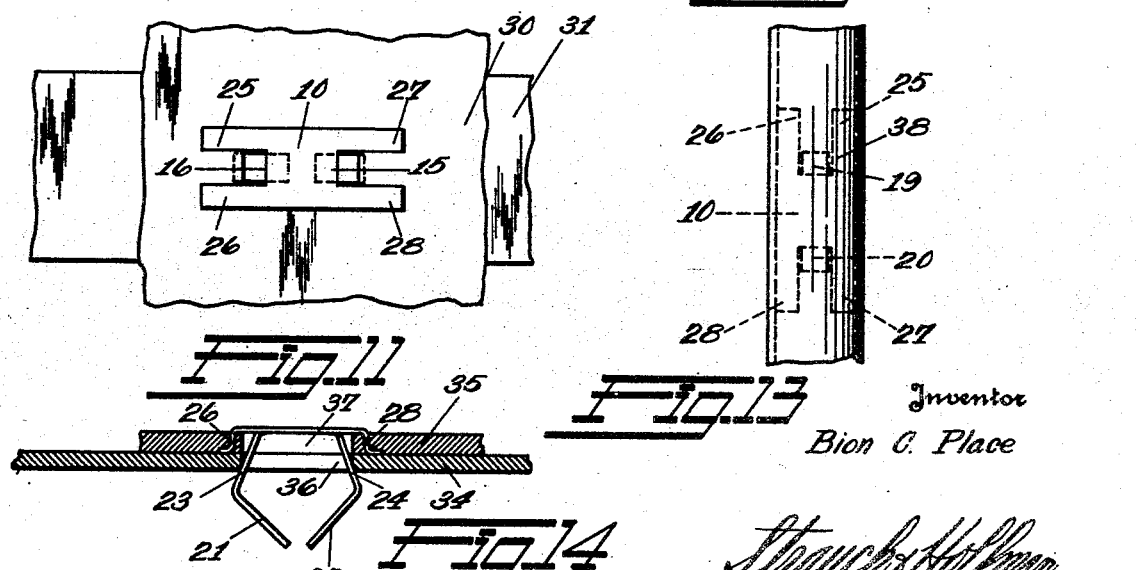
Inventor
Bion C. Place Patented Oct. 16, 1934

1,976,889

UNITED STATES PATENT OFFICE 1,976,889

FASTENER

Bion C. Place, Detroit, Mich., assignor of one-half to George E. Gagnier, Detroit, Mich.

Application June 26, 1931, Serial No. 547,127

4 Claims. (Cl. 24—213)

This invention relates to spring or snap fasteners intended particularly to secure a plurality of superposed elements in assembled relation with respect to each other by passing the shank of the fastener through openings in said elements.

More particularly the invention relates to a fastener, of the type just referred to, constructed entirely of sheet metal of a shape suitable to enable the fastener to be formed in an extremely simple manner from a blank, stamped from a metal sheet without substantial waste of metal.

In my Patent #1,679,266, granted July 31, 1928, I have disclosed a fastener having a head and an expansible and contractible shank consisting of a pair of arms that are bowed outwardly between the head of the fastener and the ends of said arm. In said patent, the fastener is constructed from a single piece of wire by bending the wire into appropriate form. The most satisfactory shape of a head for a fastener constructed of wire is the round form illustrated in said patent. For certain purposes it is desirable, however, to provide a spring fastener having a head of a form varying from the round form of said patent, and, when such is necessary, it is sometimes difficult to obtain the desired form without introducing objectionably sharp bends in the wire and without increasing the cost of production of the fastener by complicating the manufacture thereof in an endeavor to provide a head having a desired outline differing materially from that of said patent.

The need for a fastener having a head of a form other than round generally arises from the requirements of the particular situation in which the fastener is applied. For example, in attaching moldings by means of the fastener of the patent just referred to, it is desirable to have the heads of rectangular form so that the fasteners can be slid along the molding and will be prevented from rotation about an axis normal to the head of the fastener. For a further example, it is sometimes desirable to provide a head having a large bearing area so that the pull of the shank of the fastener is distributed over a relatively large portion of the material that is to be secured in position thereby, and to provide such head so that it will bear substantially evenly and to a wide extent upon said material in all lateral directions with respect to a line drawn centrally longitudinally of the shank of the fastener. Other situations arise that require a head of a special configuration difficult to produce in a wire fastener.

This invention aims to provide a fastener that can be formed from sheet metal so as to provide a head of any desired configuration without substantially increasing the cost of manufacture of the fastener, and at the same time provide an expansible and contractible shank formed from tongues struck from the head of the fastener so as to present the same advantages in application and mode of holding the superposed material in assembled relation, that are characteristic of the fastener of my previous patent just referred to.

A further object of the invention is to provide a sheet metal spring or snap fastener of a form that may be stamped or punched from a sheet of metal without material waste of the metal.

Another object of the invention is to provide a sheet metal spring fastener in which the head of the fastener is formed from the body of the blank of the fastener and in which the expansible and contractible shank is formed from a pair of tongues struck from the body of the blank and bent away from the head to form said shank.

Another object of the invention is to provide a spring fastener that is particularly adapted for the securing of moldings in position, because it includes a head that prevents the rotation of the shank of the fastener with respect to the side walls in any groove in which it may be slidably adjusted.

A still further object of the invention is to provide a sheet metal fastener that may be stamped or punched from a sheet of metal, and at the same time provided with strengthening means to stiffen the resilient portions of the fastener that are flexed when the fastener is applied to the purposes for which it is intended.

Another object of the invention is to provide a sheet metal fastener having a head so formed as to provide a plurality of projections which may be used to penetrate the material in order to fixedly attach the sheet metal fastener to the material.

Still further objects of the invention will appear as a description thereof proceeds with reference to the accompanying drawing in which:

Figure 1 is a plan view of a blank from which the improved fastener is formed.

Figure 2 is a transverse sectional view taken on the plane indicated by the line 2—2 in Figure 3.

Figure 3 is a top view of the completed fastener.

Figure 4 is an end view thereof.

Figure 5 is a plan view of a blank of a modified form of fastener.

Figure 6 is a transverse sectional view of the fastener formed from the blank shown in Figure 5.

Figure 7 is a top view of the same fastener.

Figure 8 is a view taken on the plane indicated by the line 8—8 of Figure 5.

Figure 9 is a view showing the manner in which the blanks are stamped from a sheet of metal without material waste of metal.

Figures 10 and 11 are respectively sectional and fragmentary plan views showing one application of the improved fastener.

Figures 12 and 13 are respectively sectional and fragmentary plan views of a molding having an improved fastener assembled with respect thereto showing the manner of use of the improved fastener in attaching moldings of well known form.

Figure 14 is a sectional view showing another mode of using the improved metal fastener constituting the present invention.

The spring or snap fastener of the present invention is formed entirely from a sheet metal. The preferred form of blank is illustrated in Figure 1 of the drawing and constitutes a body portion 10 and tongues 11 and 12 projecting away from said body portion in opposite directions. As illustrated, the body 10 is rectangular in outline though said body may assume any form desired of the head of a fastener as hereinafter pointed out. A pair of parallel slits 13 entering the body portion 10 serve to separate a portion of said body from the remainder so as to constitute a part of the tongue 11. Similarly, a pair of parallel slits 14, likewise entering said body, serve to separate a portion thereof so that it may constitute a part of the tongue 12.

Preferably, the tongues 11 and 12 are of such length that the sum of the lengths of said tongues corresponds to the length of the rectangular body 10. With this arrangement the blanks can be stamped from a sheet of metal without substantial waste, as illustrated in Figure 9 of the drawing. This view shows the relative position of a number of blanks, A, B, C, D, E, after stamping from a sheet of metal.

In order to form the fastener of the present invention from the blank just described, the tongues 11 and 12 are bent on transverse lines 15 and 16, connecting the ends of the slits 13 and 14 as indicated in Figure 2, and said tongues are bowed outwardly between the body 10 and the ends thereof as shown at 17 and 18, thus providing arms 19 and 20 constituting the expansible and contractible shank of the fastener. It will be observed that said arms are thus provided with guiding portions 21 and 22 that are convergently disposed with respect to each other, and holding portions 23 and 24 that are divergently disposed with respect to each other, and constitute a means for retaining the fastener in position in an aperture or perforation in a supporting structure.

After the tongues 11 and 12 are bent in the manner just described, the remainder of the body 10 forms the head of the fastener. Said head, it will be observed is of a generally rectangular form, in the illustrated embodiment, and includes projections 25, 26, 27 and 28 formed by the slits 13 and 14 and the bending of the portions of the tongue formed by said slits out of the plane of the head.

After the fastener has been bent into the form just described it is preferably then tempered to give the metal constituting the fastener a stiffness and resilience essential to attain the results presently to be referred to.

In order to enhance the stiffness of the fastener at the points of connection between the arms 19 and 20 and the head of the fastener, the body 10, constituting the head, and the portions thereof separated by the slits 13 and 14 may be provided with a lengthwise corrugation 29, as illustrated in Figures 5, 6, 7 and 8 of the drawing. The corrugation 29 extends substantially beyond the lines of bend 15 and 16. In other respects, the fastener of Figures 5, 6, 7 and 8 is the same as that illustrated in Figures 1 to 4 inclusive and like reference characters have been applied to corresponding parts.

The fastener just described may be used in a number of different ways and to accomplish various specific objects, though, generally speaking, it is adapted for use in any situation in which it is desired to secure superposed elements provided with approximately aligned apertures in proper position relative to each other. For example, in Figures 10 and 11, the fastener is shown applied to the purpose of maintaining covering material, such as a panel 30 in position over a supporting structure 31. The supporting structure 31 is provided with a suitable perforation 32, which may be square, round or in any convenient outline. The panel 30 is likewise provided with a suitable opening 33 of any convenient form though preferably said opening is rectangular in outline and of sufficient size to permit the arms 19 and 20 to be freely passed therethrough. It is not essential that the openings 32 and 33 be exactly aligned, though approximate alignment is necessary to enable the arms to be passed through the perforations 32 and the opening 33. After approximate alignment is brought about between the perforation 32 and opening 33, the arms 19 and 20 are entered in said perforation. Since the overall width of the shank of the fastener, where the arms 19 and 20 are bowed outwardly at 17 and 18, exceeds the corresponding transverse dimension of the opening and perforation, when the arms 19 and 20 are entered into the opening 23 the convergently disposed guiding portions 21 and 22 engage the edges of the perforation or opening and movement of said arms through said perforation and opening causes the arms to be bent inwardly towards each other, said arms flexing along lines of bend 15 and 16. The transverse dimension of the shank of the fastener is thus reduced and said shank accordingly is capable of being inserted through the approximately aligned openings. As the movement of the shank of the fastener through said openings is continued the arms 19 and 20 spring apart, when they are free to do so, bringing the divergently disposed holding portions 23 and 24 in contact with the inner corners of the perforation 32 as illustrated in Figure 10. In this position the spring arms 19 and 20 exert a yielding wedging action tending to draw the panel 30 toward the supporting structure 31 providing a continuously effective holding action. It is obvious that when it is desired to remove the panel 31 the fastener can be withdrawn without injury to the panel or the fastener and subsequently reapplied in the same manner.

It will be observed that in the arrangement just described the head 10 provides a relatively wide bearing surface on the panel 30 maintaining it firmly on the supporting structure. It will be readily understood that in view of the mode of construction of the fastener from sheet metal that said head may assume any other convenient form without materially increasing the cost of production and may extend laterally in any direction to the desired amount to give the holding effect desired.

If desired, the fastener just described may be secured to the member that is positioned by the fastener. Such an arrangement is illustrated in Figure 14, in which the reference character 34 designates a suitable supporting structure and 35 an element that is to be attached thereto. Said element and supporting structure are provided with approximately aligned apertures 36 and 37 to receive a shank of the fastener. The fastener is secured to the element 35 with its shank extending through aperture 37 by bending the projections 25, 26, 27 and 28 at right angles to the plane of the head of the fastener so that said projections form teeth that are caused to penetrate the element 35 so as to secure the fastener in assembled relation to said element prior to the entry of the shank thereof through the opening or perforation 36 in the supporting structure 34 in the manner above described. The teeth thus formed may be clenched against the side of said elements remote from that upon which the head of the fastener bears, as illustrated in Figure 14.

The particular fastener illustrated in the drawing is also well adapted for the purpose of securing moldings in position when used as illustrated in Figures 12 and 13. As shown in these figures a very desirable type of molding, that conceals the fasteners, includes a sheet metal strip of elongated form bent to provide a slightly rounded body portion 38 and inwardly turned edges 39 and 40 spaced from the underside of the body portion 38 providing a pair of channels between said inturned edges and the body portion. The fasteners of the present invention are readily assembled in non-rotative relation to the molding by sliding the head from one end of the molding along the body thereof after entering the projections 25 and 26 into the grooves provided between the inturned edges 39 and 40 and the body 38 of the molding. The shank of the fastener, as illustrated in Figure 12, extends away from the molding between said inturned edges. Any number of fasteners may be assembled in the manner just stated with respect to the molding and the molding may be secured in position as above described by entering the shanks of the fasteners through suitable perforations in the supporting structure. Said moldings may be used to retain panels in place or it may be simply finish moldings, the fastener of the present application is adapted to secure said molding in position irrespective of the particular uses to which the molding is put.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece sheet metal snap fastener complete in itself for securing finish material upon a supporting structure, and formed of a flat sheet metallic blank having strips extending beyond the body thereof, consisting of a head formed from the body of the blank, and a pair of stiff resilient spaced arms including said strips and parts of said body separated from the blank by slits cut from the ends thereof parallel to the strip edges, said arms being bent away from said head and shaped so that they will grip the walls of a perforation in said supporting structure when pressed toward each other and then permitted to expand in said perforation and being corrugated lengthwise thereof at the points at which they are bent away from said head to resist bending of said arms with respect to said head.

2. A sheet metal snap fastener comprising a head having a pair of integrally united stiff spring arms stamped from a sheet metal blank, said arms being bent away from said head and shaped to provide means to enter a perforation in a supporting structure and engage the edges thereof resiliently to prevent withdrawal of the fastener, said head and arms being corrugated longitudinally to stiffen said arms across the lines of bends in the plane of said head.

3. A sheet metal snap fastener complete in itself for securing finish material upon a supporting structure and stamped from a blank without waste of material, consisting of a head of a letter H-shaped form and a pair of stiff resilient arms projecting away from the portion of said head constituting the cross bar of said letter H and having a width corresponding to the length of said cross bar, said arms being bent to provide relatively straight divergently disposed portions adjacent said head and convergently disposed portions remote from said head to grip the walls of a perforation in said supporting structure to prevent ready withdrawal therefrom, and having a width related to the width of the parallel bars of said letter H, so that fasteners can be stamped from a sheet of metal without waste.

4. A sheet metal snap fastener complete in itself for securing finish material upon a supporting structure and stamped from a blank without waste of material, consisting of a head of a letter H-shaped form and a pair of stiff resilient arms projecting away from opposite sides of the cross bar of said letter H and having a width corresponding to the length of said cross bar, said arms being outwardly bowed with respect to each other between the head of the fastener and the ends thereof to engage the walls of a perforation in said supporting structure to prevent ready withdrawal therefrom, said arms having a width substantially equal to the width of the parallel bars of said letter H so that fasteners can be stamped from a sheet of metal without waste.

BION C. PLACE.